June 2, 1942.　　　E. D. SCHNEIDER　　　2,285,172
CONTROL SYSTEM
Filed May 25, 1940
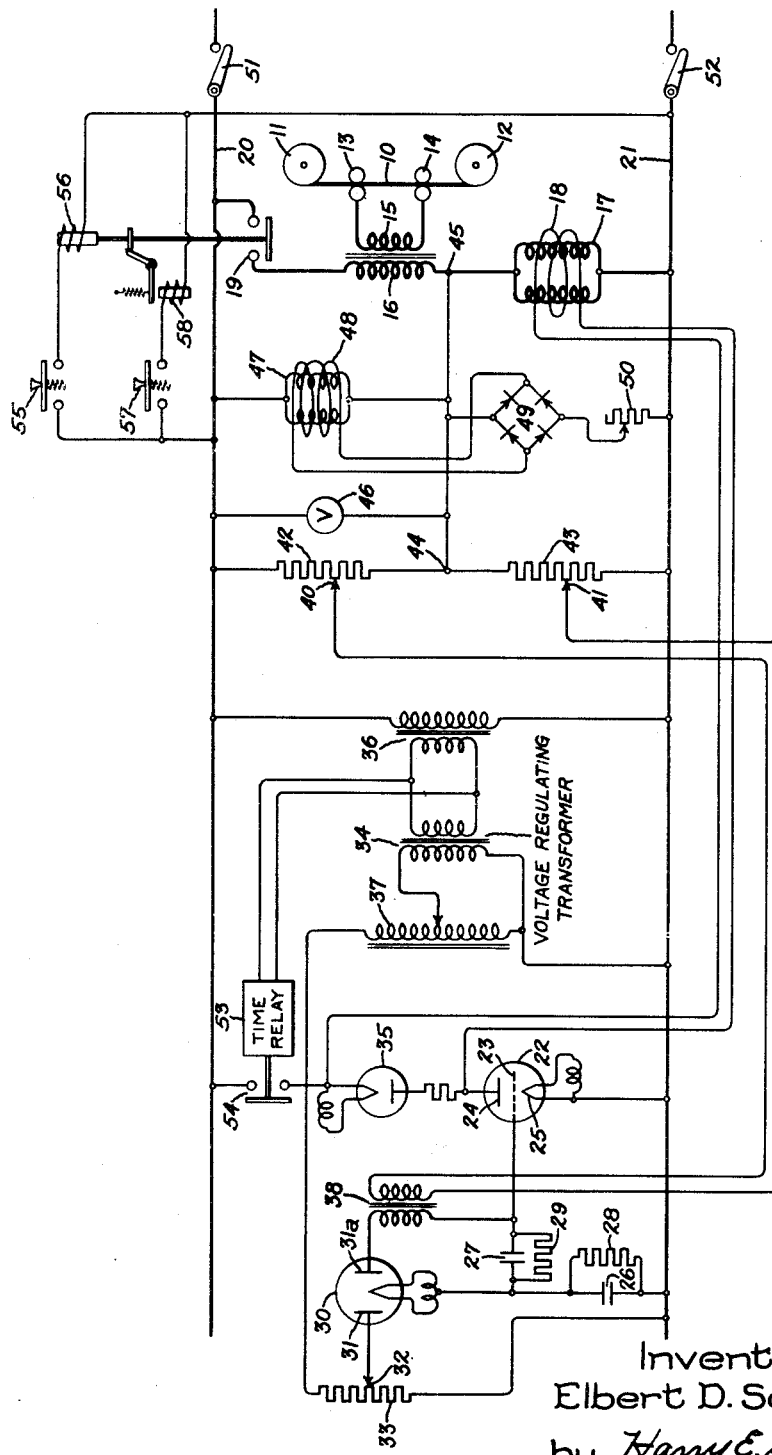
Inventor:
Elbert D. Schneider,
by Harry E. Dunham
His Attorney.

Patented June 2, 1942

2,285,172

UNITED STATES PATENT OFFICE 2,285,172

CONTROL SYSTEM

Elbert D. Schneider, Scotia, N. Y., assignor to General Electric Company, a corporation of New York Application May 25, 1940, Serial No. 337,304

13 Claims. (Cl. 171—119)

This invention relates to control systems, more particularly to heating control systems for heating work pieces directly by passing a current through them, such as a continuously moving wire, or resistors, and has for its object a simple and reliable system of this character wherein the heating operation is controlled by maintaining a predetermined voltage across the part being heated.

In carrying out my invention in one form, I utilize a variable impedance device, as shown, a saturable core reactor, for controlling the current input to the load article or part being heated together with means responsive to the difference between a fixed voltage and a voltage across the load for supplying direct current to vary the saturation of the reactor. I also provide a second saturable reactor connected across the load and connected to be saturated in inverse relation with the first reactor whereby the voltage to be maintained on the load may be adjusted before the load is energized.

For a more complete understanding of my invention, reference should be had to the accompanying drawing, the single figure of which is a diagrammatic representation of a heating system embodying my invention.

Referring to the drawing, I have shown my invention in one form as applied to the heating of a length of a wire 10 as it is received from a wire drawing machine or passed from one roll 11 to another roll 12. The wire 10 passes between suitable electrical contact devices 13 and 14 spaced apart a distance equal to the length of wire to be heated and connected to the terminals of a low voltage transformer secondary 15 whereby the length of wire between the contact devices is connected in circuit with the winding 15. In series with the primary winding 16 for the secondary winding 15 is a saturable core reactor 17 provided with a direct current saturating winding 18 and a disconnecting switch or circuit breaker 19, this circuit being connected to suitable alternating current supply mains 20 and 21.

Saturating current for the reactor is supplied to the winding 18 by an electric valve device 22 connected in series with the winding 18 across the supply mains 20 and 21. The discharge device 22 is preferably of the three-element vapor electric type characterized by a large power output controlled by a small amount of grid energy as is well known in the art. The sealed envelope of this device contains a small quantity of inert gas, such as mercury vapor, whereby the device operates as an arc rectifier. It will be understood that at certain critical values of voltage applied to the grid 23, when the anode 24 is positive an arc will be formed between the anode and the cathode 25 and continue thereafter independently of the grid voltage as long as the anode is positive. Furthermore, as long as the grid voltage is more negative with respect to the anode voltage than the critical value at which the arc starts, the arc is prevented from starting and no current flows through the discharge device.

For the control of the discharge device 22, condensers 26 and 27 respectively in parallel with the resistances 28 and 29 are provided, as described and claimed in U. S. Patent No. 1,904,485, issued on April 18, 1933, to Orrin W. Livingston. The charges on the condensers 26 and 27 which are connected in opposition to each other in the circuit of the grid 23 so that their differential voltage only is applied to the grid, are controlled by a double rectifying discharge device 30.

A control voltage is supplied to the anode 31 of the device 30 from an adjustable tap 32 on a potentiometer resistance 33. A substantially constant voltage is supplied to the resistance 33 from a substantially constant voltage regulating transformer 34 and consequently a fixed voltage determined by the position of the tap 32 is applied to the anode 31. The condenser 26 is therefore charged to a potential which depends upon the adjustment of the tap 32. The grid 23 of the device 22 which is connected to the positive side of the condenser 26, becomes sufficiently positive for the device 22 to pass current through the saturating winding 18 at such time in the current half-wave as to give the desired pulsating current value and saturating of the reactor 17 corresponding to the adjustment of the tap 32. A suitable half-wave rectifying device 35 is connected in parallel with the winding 18 and passes current during the alternate half cycles that the discharge device 22 is not operating so as to maintain during these half cycles the current in the winding 18 by reason of the inductive voltage in the winding 18.

The condenser 27 introduces a feed-back control voltage for the discharge device 22 which is proportional to the voltage applied to the load transformer primary winding 16. It should be noted that the resistance 28 connected in parallel with the condenser 26 is preferably of such a high value as to maintain a substantially constant voltage across the condenser 26 from the pulsating voltage supplied by the discharge device 30. In other words, the resistance 28 is of such high value that the voltage of the condenser decreases very little between pulsations by leaking through the resistance. On the other hand, the resistance 29 is of a relatively low value so that between the pulsating voltages applied to the condenser 27, the voltage of the condenser decreases, in a typical case to less than one-half the peak pulsating voltage. This produces a differential pulsating control voltage for the grid 23.

As shown, the voltage regulating transformer 34 is connected to the secondary of a voltage reducing transformer 36 having its primary winding connected to the supply mains 20 and 21. This transformer 34 is constructed suitably to give a substantially constant output voltage over the range of voltage variation of the supply mains 20 and 21 as reflected by the transformer 36. Its output winding is connected to an iron core autotransformer winding 37 giving an increased voltage suitable for the resistance 33. Preferably also the winding 37 has inductively associated with it secondary windings for supplying heating current for the filaments of the discharge devices 22, 30 and 35.

The charging of the condenser 27 is effected by pulsating voltage through half of the rectifier 30 having the anode 31a, energy being supplied from a transformer 38 whose primary winding is connected through adjustable taps 40 and 41 to potentiometer resistances 42 and 43 connected in series with each other across the supply mains 20 and 21. A point 44 between the resistors is connected to the point 45 between the reactor 17 and the transformer winding 16 so that the resistor 42 is connected across the winding 16 and the resistance 43 across the reactor.

It is contemplated that the adjustment of the taps 40 and 41 will be an installation adjustment. The tap 41 is adjusted with the condenser 26 fully discharged, the tap 41 being moved downward on the resistance 43, as seen on the drawing, to such a point that the discharge device 22 does not pass current. Under these conditions, of course, the reactor 17 is unsaturated and, consequently, no appreciable current flows in the winding 16 and no appreciable voltage drop appears across the winding. With this adjustment any voltage across the condenser 26 thereafter produced by operation of the discharge device 30 starts operation of the discharge device 22 throughout portions of its positive half cycles.

After this adjustment of the tap 41 has been made, the condenser 26 is fully charged and the tap 40 is moved upward on the resistance 42 as seen in the drawing until the voltage across the winding 16 begins to decrease, as indicated by a voltmeter 46 connected across the winding. This decrease in the voltage across the winding indicates that the reactor is just fully saturated and, in other words, the winding 18 is then supplied with current sufficient only to fully saturate it. It will be understood that if the current in the winding 18 is increased beyond the value of substantially complete saturation but little if any useful purpose is served by this increase in current. This adjustment of the tap 40 prevents such increase in current.

A second saturable core reactor 47 connected across the winding 16 and the switch 19 and therefore in series with the reactor 17 to the mains 20 and 21, i. e., from the main 20 to the point 45, is provided for the purpose of preventing the full voltage drop of the mains 20 and 21 across the switch 19 when the switch is open. It will be observed that otherwise when the switch is open, no current flows through the saturable reactor 17 and, consequently, there is no voltage drop across it. Also if the resistor load 10 across the secondary winding 15 were removed with the switch 19 closed, substantially full supply voltage would be applied to the winding 16. The disadvantage of full line voltage across the switch 19 when it is open is that the operator cannot then adjust by means of the taps 32 on the potentiometer 33 the voltage supplied to the winding 16 and hence the voltage supplied to the load 10. In other words, it would be necessary to apply the full line voltage to the winding 16 in order to cause the saturable reactor 17 to draw current and immediately thereby drop the voltage to some low desired operating value corresponding to the setting of the tap 32. The disadvantage of full supply voltage across the winding 16 with the switch 19 closed when the load is removed is that when the load is again connected a high voltage is applied to the load with momentary overheating.

This disadvantageous condition is obviated by saturating the reactor 47 to such an extent that it passes the full excitation current of the reactor 17 when the switch 19 is open or the load 10 is removed. As shown, the exciting winding 48 of the reactor 47 is connected across a two-way copper oxide rectifier 49 which, in turn, is connected in parallel with the reactor 17 in series with an adjustable resistance 50. By adjustment of the resistor 50, the saturation of the reactor 47 is adjusted so that this reactor carries the exciting current of the reactor 17. Therefore, in the operation of the system, the resistance tap 32 is adjusted to give the desired voltage for the winding 16 as indicated by the voltmeter 46 with the switch 19 open. The switch 19 is then closed and load current supplied without substantial readjustment in the voltage across the winding 16.

Another advantage of the reactor 47 is that it provides by reason of its excitation in response to the voltage across the reactor 17, and consequently impedance of the reactor 17, a wide range of possible voltage adjustment on the load by adjustment of the tap 32. It will be understood that for very light loads, i. e., small current through the load circuit and through the reactor 17, the reactor 47 is more highly saturated for its saturation varies inversely with the saturation of the reactor 17. When the reactor 17 is substantially unsaturated with a light load, the reactor 47 is substantially saturated so that the reactor 47 carries more current and has a low voltage only across it and across the winding 16. If this inverse saturation of the reactor 47 were not provided, the voltage across the winding 16 could not be satisfactorily reduced by unsaturating the reactor 17 to give a very low supply voltage. In other words, with the reactor 17 completely unsaturated, its exciting current would cause a substantial voltage across the winding 16 if the saturation of the reactor 47 were not correspondingly increased to take care of this excitation current. The arrangement of a reactor in parallel with a load and its excitation in response to the voltage across a load reactor is described and claimed in a copending application of Dudley E. Chambers, Serial No. 334,599, filed May 11, 1940, and assigned to the same assignee as this invention. The invention of said Chambers' copending application was made prior to my present invention and said Chambers' application is therefore to be regarded as prior art with respect to the invention disclosed in this application.

In the operation of the system, the disconnecting switches 51 and 52 are closed to energize the supply mains 20 and 21. This energizes the apparatus connected to the mains. After a predetermined time interval, the time relay 53 closes a switch 54 in the output circuit of the discharge device 22, the filament of the discharge device having been heated during that time interval. At this time, the voltmeter 46 indicates the voltage which will be applied to the winding 16, constituting a load device, when the switch 19 is closed. This voltage is adjusted if required by adjusting the position of the tap 32 on the resistance 33 so as to give a voltage across the winding 16 which will give the desired voltage on the section of the wire 10 to be heated. When this adjustment has been made, the switch 19 is closed, as shown, by closing a push button 55 in circuit with an operating coil 56 for the switch 19. The switch may be opened by pressing a button 57 which energizes a coil 58 to release a latch holding the switch closed. Some slight further adjustment of the voltage may be necessary after the switch 19 is closed in order to compensate for the voltage regulation of the equipment.

A typical system constructed and arranged as described herein gave a wide range of working voltages on the secondary winding 15 of from, for example, 20 to 100 per cent with a small variation in this voltage, for example, five per cent, for a change in kilowatt load from 5 to 100 per cent.

While I have shown the system as applied to the heating continuously of a wire, it obviously may be applied to the heating of various electrically resistant loads, such as short articles or sections of articles or a heating resistance.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A control system comprising a load current supply transformer having primary and secondary windings, a saturable core reactor, a connection between one terminal of said primary winding and one terminal of said reactor, current supply means connected to the other terminals of said primary winding and reactor, a switch in the connection between said primary winding and said supply means, connections for supplying a control voltage, a saturating winding for said reactor, means responsive to the difference between said control voltage and a voltage across said transformer for supplying current to said saturating winding to maintain a predetermined voltage across said transformer, and means responsive to the impedance of said reactor for supplying excitation current to said reactor when said switch is open.

2. A control system comprising a load current supply transformer having primary and secondary windings, a variable impedance device, a connection between one terminal of said primary winding and one terminal of said impedance device, current supply means connected to the other terminals of said primary winding and impedance device, a normally open switch in the connection between said primary winding and said supply means, constant voltage output means connected to said supply means, a potentiometer resistance connected to said constant voltage output means, means responsive to the difference between a voltage across said potentiometer resistance and a voltage across said transformer for controlling said variable impedance device to maintain a predetermined voltage across said transformer, and means responsive to the voltage across said impedance device for supplying exciting current to said impedance device when said switch is open.

3. A control system comprising a load current supply transformer having primary and secondary windings, a saturable core reactor, a connection between one terminal of said primary winding and one terminal of said reactor, current supply means connected to the other terminals of said primary winding and reactor, a normally open switch in the connection between said primary winding and said supply means, constant voltage output means connected to said supply means, a potentiometer resistance connected to said constant voltage output means, a saturating winding for said reactor, an electric discharge device for supplying current to said saturating winding, means responsive to the difference between a voltage across said potentiometer resistance and a voltage across said transformer for controlling said electric discharge means to maintain a predetermined voltage across said transformer, a second saturable core reactor connected across said primary winding and said switch and means responsive to the impedance of said first reactor for controlling said second reactor to supply excitation current to said first reactor when said switch is open.

4. A control system comprising a saturable core reactor, connections for connecting said reactor in series with a load device, a saturating winding for said reactor, means for supplying current to said saturating winding to maintain a predetermined voltage across said load device, a second saturable reactor connected across said load device, and means responsive to the voltage across said first reactor for controlling the saturation of said second reactor.

5. A control system comprising a saturable core reactor, connections for connecting said reactor in circuit with a load device, connections for supplying a control voltage, a saturating winding for said reactor, means responsive to the difference between said control voltage and the voltage across said load device for supplying current to said saturating winding to maintain a predetermined voltage across said load device, a second saturable core reactor connected across said load device, and means responsive to the voltage across said first reactor for controlling the saturation of said second reactor.

6. A control system comprising a load current supply transformer having primary and secondary windings, a saturable core reactor, a connection between one terminal of said primary winding and one terminal of said reactor, current supply means connected to the other terminals of said primary winding and reactor, a normally open switch in the connection between said primary winding and said supply means, connections for supplying a control voltage, a saturating winding for said reactor, means responsive to the difference between said control voltage and a voltage across said primary winding for supplying current to said saturating winding to maintain a predetermined voltage across said primary winding, a second saturable reactor connected across said primary winding and said switch, and means responsive to the voltage across said first reactor for saturating said second reactor.

7. A control system comprising a load current supply transformer having primary and secondary windings, a saturable core reactor, a connection between one terminal of said primary winding and one terminal of said reactor, current supply means connected to the other terminals of said primary winding and reactor, a normally open switch in the connection between said primary winding and said supply means, constant voltage output means connected to said supply means, a potentiometer resistance connected to said constant voltage output means, a saturating winding for said reactor, an electric discharge device for supplying current to said saturating winding, means responsive to the difference between the voltage across said potentiometer resistance and the voltage across said primary winding for controlling said electric discharge means to maintain a predetermined voltage across said primary winding, a second saturable reactor connected across said primary winding and said switch, and means responsive to the voltage across said first reactor for controlling the saturation of said second reactor.

8. A control system comprising a variable impedance device, means for varying the impedance of said device, a second variable impedance device, switching means for connecting said impedance devices in series with each other to a source of electrical supply, a second switching means for connecting a load device across said second impedance device, and means responsive to an electric condition of said first impedance device for controlling said second impedance device in inverse relation to the impedance of said first impedance device.

9. A control system comprising a variable impedance device, means for varying the impedance of said device, a second variable impedance device, connections for connecting said second impedance device in series with said first impedance device to electric current supply means, switching means for connecting a load device across said second variable impedance device, and means responsive to the voltage across said first impedance device for controlling said second impedance device so as to maintain a substantially constant voltage across said second impedance device regardless of whether said switching means connects or disconnects the load device.

10. A control system comprising a variable impedance device, means for varying the impedance of said device, a second variable impedance device, connecting means for connecting said second impedance device in series with said first impedance device to electric current supply means, switching means independent of said connecting means for connecting a load device across said second variable impedance device, and means responsive to the impedance of said first impedance device for controlling said second impedance device to supply excitation current to said first impedance device when the load device is disconnected by said switching means.

11. A control system comprising a saturable core reactor, electric switching means for connecting said reactor in series with a load device to electric current supply means, a saturating winding for said reactor, means for controlling the current supplied to said saturating winding, a second saturable core reactor, connections for connecting said second reactor in series with said first reactor and across said switching means and the load device, a saturating winding for said second reactor, means responsive to the voltage across said first reactor for supplying current to said second saturating winding, and means for adjusting the current supplied to said second saturating winding so as to maintain a substantially constant voltage across said second reactor regardless of whether said switching means connects or disconnects the load device.

12. A control system comprising a saturable core reactor, electric switching means for connecting said reactor in series with a load device to electric current supply means, a saturating winding for said reactor, means for controlling said saturating winding in response to the voltage across the load device, a second saturable core reactor, connections for connecting said second reactor in series with said first reactor and across said switching means and the load device, a second saturating winding for said second reactor, means responsive to the impedance of said first reactor for supplying current to said second saturating winding in inverse relation to the saturation of said first reactor so as to maintain a substantially constant voltage across said second reactor regardless of whether the load device is connected or disconnected by said switching means.

13. A control system comprising a load device, variable impedance means connected in circuit with said load device, a control winding for said variable impedance means, a condenser, means for supplying a substantially constant voltage to charge said condenser to a predetermined value, a second condenser, means jointly responsive to the voltages across said load device and said impedance means for charging said second condenser, and means responsive to the difference between the voltages across said condensers for supplying current to said control winding so as to maintain a substantially constant predetermined voltage across said load device.

ELBERT D. SCHNEIDER.